Dec. 14, 1926.
C. C. SPREEN
MECHANICAL REFRIGERATION
Filed June 3, 1926
1,610,896
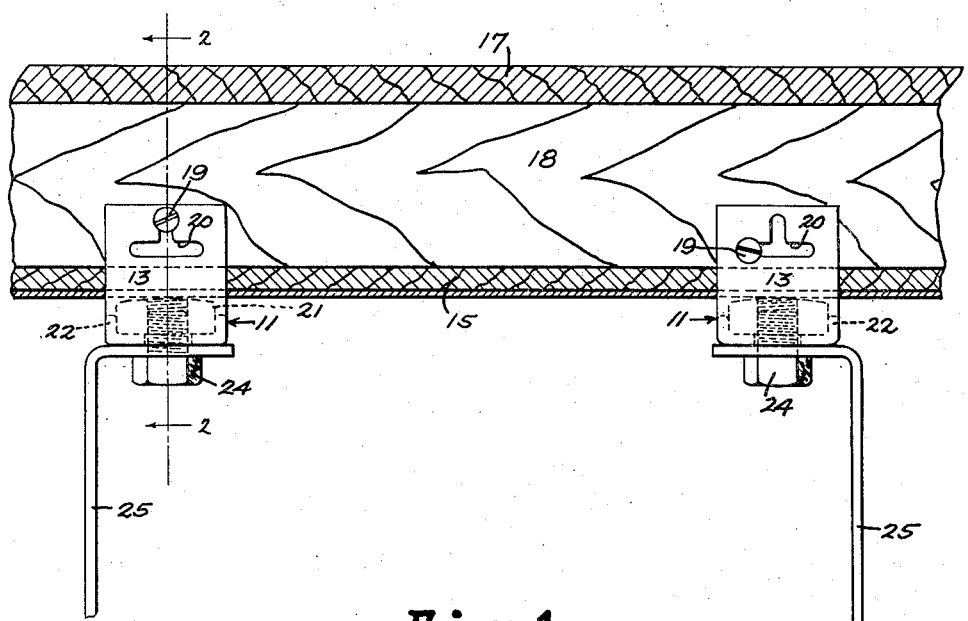
Fig. 1
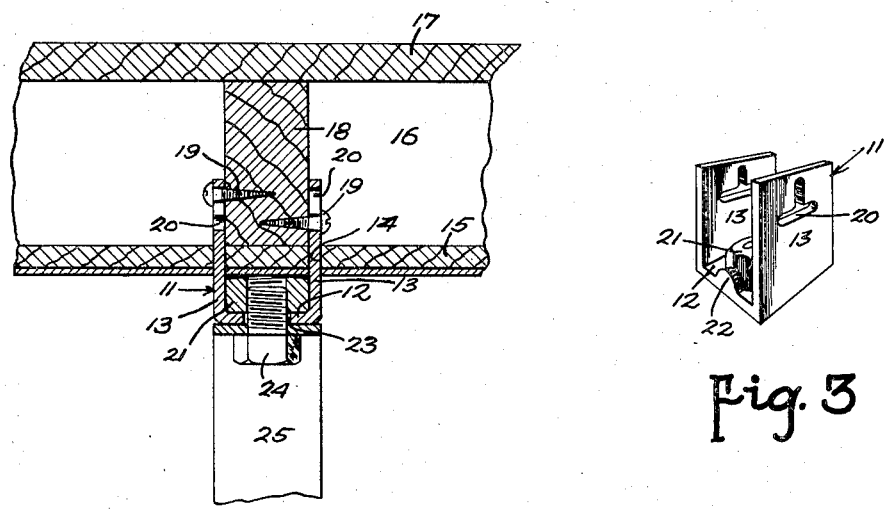
Fig. 2
Fig. 3
Charles C. Spreen
Inventor
by Smith and Freeman
Attorneys Patented Dec. 14, 1926.

1,610,896

UNITED STATES PATENT OFFICE.

CHARLES C. SPREEN, OF DETROIT, MICHIGAN.

MECHANICAL REFRIGERATION.

Application filed June 3, 1926. Serial No. 113,469.

My invention relates to mechanical refrigeration, and particularly to means for supporting in the refrigerating chamber of a refrigerator cabinet refrigerating apparatus such as a brine tank or the like, and the principal object of my invention is to provide new and improved supporting means for this purpose. In the drawings accompanying this specification and forming a part of this application I have shown, for purposes of illustration, one form which my invention may assume. In these drawings:

Figure 1 is a section showing a side elevation of this embodiment of my invention applied to the wall of the refrigerator cabinet and supporting refrigerating apparatus.

Figure 2 is a section on the line 2—2 of Figure 1, while

Figure 3 is a perspective of the securing means itself.

The securing means 11 herein shown comprises a base 12 from which extend two legs 13 arranged to be inserted through apertures 14 in the inner wall 15 of the refrigerator cabinet into the space 16 between the inner wall 15 and the outer wall 17 and into position embracing one of the cross members 18 extending between and connecting the inner wall 15 and the outer wall 17, the supporting means 11 being then secured in this position by means of screws 19 extending into the cross member 18 through apertures 20 provided in the legs 13 and formed T-shaped so that the screws 19 extending into the cross member 18 from the two sides thereof need not be alined but may be staggered as illustrated both in Figure 1 and in Figure 2.

The securing means 11 also comprising a nut 21 positioned upon the base 12 between the two legs 13 and held against displacement and rotation in any suitable manner, as by engagement with the legs 13 and lips 22 as herein shown, or by welding to the base 12, and the base 12 is provided with a central aperture 23 alined with the aperture in the nut 21 to permit the insertion into the nut 21 of a cooperating bolt 24 passing through an aperture in and securing to the supporting means 11 one of a series of straps 25 by which the refrigerating apparatus is supported, the support for the refrigerating apparatus being of any suitable type but preferably of that type shown in Letters Patent 1,572,851 granted February 9, 1926, for my invention in universal brine tank supports.

It will of course be obvious to those skilled in the art that the supporting means 11 are positioned in the refrigerating cabinet at the time of the manufacture thereof and are thereafter available at any time to support the refrigerating apparatus.

At the same time, it will also be obvious to those skilled in the art that the particular embodiment of my invention herein shown and described may be variously changed and modified without departing from the spirit of my invention or sacrificing the advantages thereof and it will therefore be understood that the disclosure herein is illustrative only and that my invention is not limited thereto.

I claim:

A refrigerator cabinet comprising an outer wall, an inner wall, and cross-members between said outer wall and said inner wall; having a refrigerating chamber for the reception of refrigerating apparatus, such as a brine tank or the like, arranged to be supported by means having a plurality of screw-threaded connecting terminals; and comprising also means for supporting said refrigerating chamber by said connecting terminals comprising a plurality of units each itself comprising: a nut arranged to receive one of said screw-threaded connecting terminals; a U-shaped member having its base disposed within said refrigerating chamber and provided with an aperture for the passage of one of said connecting terminals, having its legs extending through said inner wall into the space between said inner wall and said outer wall and embracing one of said cross-members, and supporting said nut above said base between said legs in alinement with said aperture and held against rotation; and means securing said legs to said cross-member.

In testimony whereof I hereunto affix my signature.

CHARLES C. SPREEN.